UNITED STATES PATENT OFFICE.

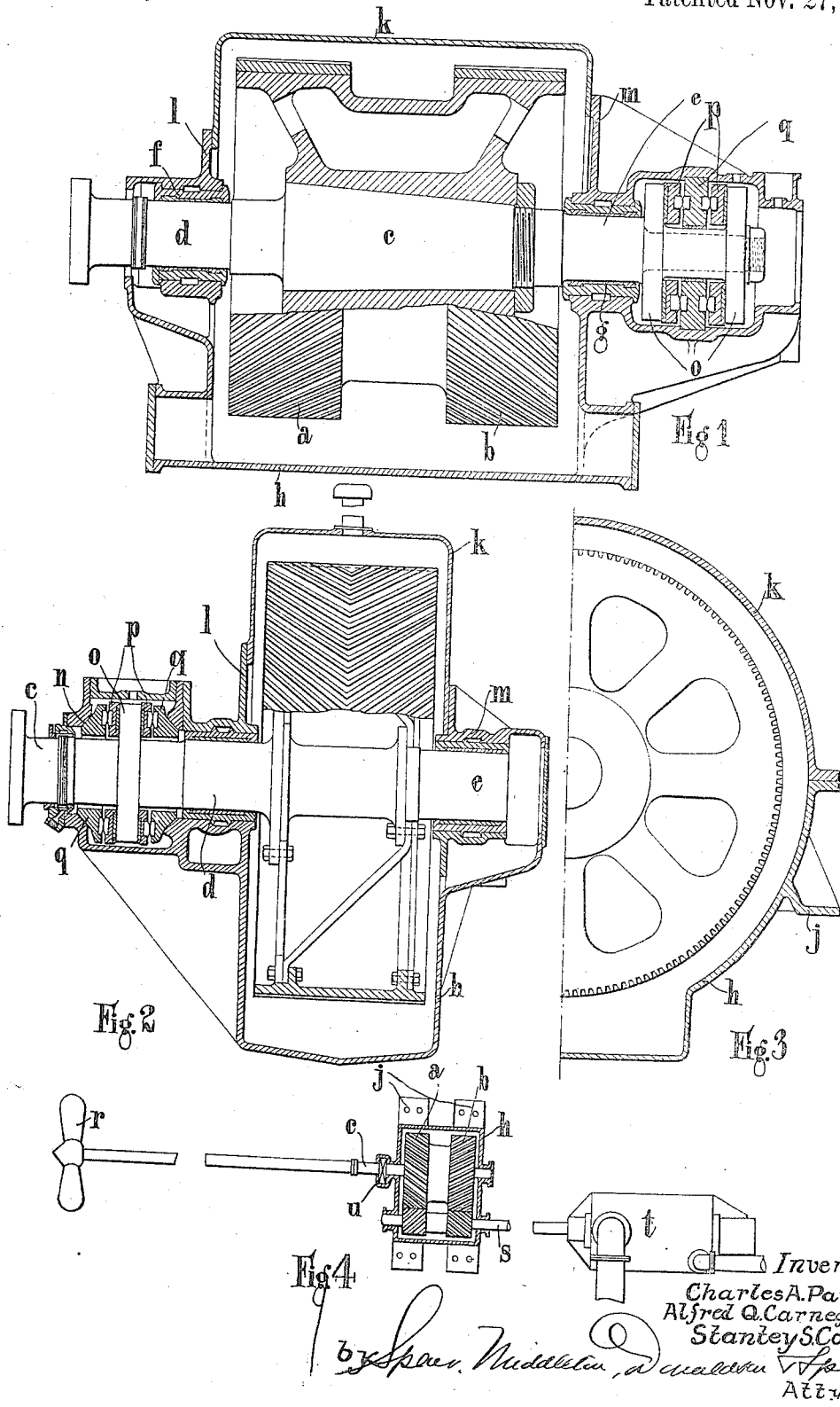

CHARLES ALGERNON PARSONS, ALFRED QUINTIN CARNEGIE, AND STANLEY SMITH COOK, OF WALLSEND, ENGLAND; SAID CARNEGIE AND SAID COOK ASSIGNORS TO SAID PARSONS.

POWER-TRANSMITTING MECHANISM.

1,248,154.  Specification of Letters Patent.  Patented Nov. 27, 1917.

Application filed May 31, 1916. Serial No. 100,962.

*To all whom it may concern:*

Be it known that we, CHARLES ALGERNON PARSONS, ALFRED QUINTIN CARNEGIE, and STANLEY SMITH COOK, all subjects of the King of Great Britain and Ireland, and all residing at Turbinia Works, Wallsend-on-Tyne, in the county of Northumberland, England, have invented a certain new and useful Power-Transmitting Mechanism, of which the following is a specification.

The present invention relates to marine geared turbine installations and relates more particularly to an improved arrangement of gear wheel casing and propeller thrust block such as is described in co-pending application Serial No. 25582 filed May 3rd, 1915.

Referring to the accompanying drawings:—
Figure 1 shows one mode of carrying the present invention into effect in which the ahead and astern thrust bearings are arranged in proximity and upon the ahead side of the gear wheel and in which two thrust collars are provided upon the spindle.

Fig. 2 shows a modified construction in which a single thrust collar is employed and the ahead and astern thrust bearings are located on the astern side of the gear wheel.

Fig. 3, is a part cross section of Fig. 2.

Fig. 4 shows diagrammatically a general arrangement of parts.

In carrying this invention into effect according to one form and as shown in Fig. 1, the body of the main gear wheel $a-b$, which is preferably of the double helical type, is in the form of a cylinder with a spindle $c$ passing through it and projecting at each end. These projecting portions $d$ $e$ are supported in journal bearings $f$ $g$ in the ends of the gear case $h$ on which are formed feet $j$ (as shown in Figs. 3 and 4), for attachment to the ship's bottom. The upper part of the casing is conveniently formed as a detachable cap or hood $k$ secured by suitable studs or bolts. The upper part of each journal bearing is preferably formed as a separate cap $l$ $m$ bolted to the lower portion $h$ of the casing and to the sides of the casing cover $k$. Upon one end of the spindle $c$ two thrust collars $o$ $o$ are arranged in proximity to one another and outside the bearing of the journal $e$ with the ahead and astern thrust bearings placed between them and backing upon a single housing $q$.

The thrust bearings are composed of pivoted pressure blocks $p$ which bear against the collars $o$ $o$ and are adapted to rock upon the housing $q$, the rocking being provided for by furnishing the pressure blocks with spherical backs which bear against plane faces upon the housing $q$.

The pivoted blocks may be supported in any suitable manner upon the housing $q$ so long as they can freely rock and they may be of the symmetrically supported type as described in the British Patents 8266 of 1912 and 29810 of 1912, or they may be of the unsymmetrically supported type.

Fig. 2 shows a modified construction in which a single thrust collar $o$ is employed, the ahead and astern thrust bearing engaging this collar upon opposite sides.

It will be understood that the lower part of the casing in the construction shown in Fig. 1, as well as in the construction shown in Fig. 2, is provided with feet $j$ by which the casing is attached to the ship's structure, and through which the propeller thrust is transmitted to the ship.

In all the forms described it will be observed that the propulsive thrust strains tending to move the gear wheel and spindle $c$ axially are taken directly on to the gear box structure and from there transmitted to the ship's framing by way of the feet $j$.

By the constructions employed it will be seen further that a single seating upon the ship's framing serves to support the entire unit comprising the gear wheel casing and thrust bearing and to transmit the propeller thrust to the ship's structure, so that these constructions permit of considerable reduction of weight, space and cost. The compactness arising from the new constructions and the simplification of obtaining alinement in erecting is illustrated in Fig. 4 in which $r$ represents a propeller, $t$ a turbine, $s$ the pinion spindle and $c$ the gear wheel spindle of the turbine gear. These two spindles are supported in bearings in the gear case $h$ and upon one side of $a$ $b$ the thrust device $u$ is arranged.

It will be seen from this illustration how the new constructions facilitate the correct alinement of the thrust device and transmission gear and provide a more compact arrangement than has hitherto been practicable when employing separate seatings for the thrust bearing and gear case.

Having now described our invention, what we claim as new and desire to secure by Letters Patent is:—

1. In combination in a geared ship propulsion installation, a gear wheel casing, feet upon said casing, bearings in said casing, a shaft rotatably mounted in said bearings, a main gear wheel mounted on said shaft, ahead and astern thrust bearings in operative relation upon one side of said gear wheel, all said parts being within said gear wheel casing, said casing being attached by said feet to the ship's structure.

2. In combination in a geared marine turbine installation as a single unit, a gear wheel casing, feet upon said casing, bearings in said casing, a shaft rotatably mounted in said bearings, a main gear wheel mounted on said shaft, further bearings in said casing, a second shaft rotatably mounted in said bearings, a pinion mounted upon said second shaft and engaging said gear wheel, ahead and astern thrust bearings in operative relation upon one side of said wheel, said thrust bearings acting to transmit propeller thrusts to said casing, all said parts being within said gear wheel casing, said feet being adapted to support said unit and transmit the whole of said propeller thrusts to the ship's structure.

In testimony whereof, we have affixed our signatures.

CHARLES ALGERNON PARSONS.
ALFRED QUINTIN CARNEGIE.
STANLEY SMITH COOK.